United States Patent
Niwa et al.

(10) Patent No.: US 8,023,698 B2
(45) Date of Patent: Sep. 20, 2011

(54) INFORMATION DEVICE OPERATION APPARATUS

(75) Inventors: Shinji Niwa, Nagoya (JP); Takeshi Kawashima, Nisshin (JP); Ichiro Akahori, Anjo (JP); Toshiyuki Morishita, Nagoya (JP)

(73) Assignee: DENSO CORPORATION, Kariya (JP)

( * ) Notice: Subject to any disclaimer, the term of this patent is extended or adjusted under 35 U.S.C. 154(b) by 831 days.

(21) Appl. No.: 12/076,863

(22) Filed: Mar. 25, 2008

(65) Prior Publication Data

US 2008/0240507 A1    Oct. 2, 2008

(30) Foreign Application Priority Data

Mar. 30, 2007    (JP) .................................. 2007-092450

(51) Int. Cl.
G06K 9/00    (2006.01)
H04N 5/225    (2006.01)
(52) U.S. Cl. ........................................ 382/103; 348/169
(58) Field of Classification Search .................. 382/103, 382/104, 115, 190, 198, 285; 348/169, 170, 348/171, 172; 345/156, 157, 158; 351/209
See application file for complete search history.

(56) References Cited

U.S. PATENT DOCUMENTS

| | | | | |
|---|---|---|---|---|
| 5,412,487 A | * | 5/1995 | Nishimura et al. | 358/452 |
| 5,548,667 A | * | 8/1996 | Tu | 382/285 |
| 6,144,366 A | * | 11/2000 | Numazaki et al. | 345/156 |
| 6,578,962 B1 | | 6/2003 | Amir et al. | |
| 6,636,635 B2 | * | 10/2003 | Matsugu | 382/218 |
| 2007/0230929 A1 | | 10/2007 | Niwa et al. | |

FOREIGN PATENT DOCUMENTS

| | | |
|---|---|---|
| EP | 1 608 157 A2 | 12/2005 |
| JP | A-2000-331170 | 11/2000 |
| JP | A-2005-063090 | 3/2005 |
| JP | A-2005-135439 | 5/2005 |
| JP | A-2006-285370 | 10/2006 |

OTHER PUBLICATIONS

Office Action dated May 26, 2009 from the Japan Patent Office in the corresponding JP application No. 2007-092450 (and English Translation).
Office Action dated Mar. 25, 2009 issued from the German Patent Office for counterpart application No. 10 2008 016 215.9-53 (English translation enclosed).
Office Action mailed Feb. 10, 2010 from German Patent Office in the corresponding DE application No. 10 2008 016 215.9 (and English translation).
Lance Williams, "Performance-Driven Facial Animation," Computer Graphics, Aug. 1990, vol. 24, No. 4, pp. 235-242.
Office Action mailed on Jun. 7, 2011 issued in the corresponding Japanese Patent Application No. 2007-092450 (English translation enclosed).

* cited by examiner

Primary Examiner — Abolfazl Tabatabai
(74) Attorney, Agent, or Firm — Posz Law Group, PLC

(57) ABSTRACT

An information device operation apparatus includes an image capturing device, an illumination device, a controller, image storage device, operation object extracting device, detection device, and signal output device. The image storage device stores a plurality of images that are acquired by the image capturing device under a plurality of illumination intensity conditions. The operation object extracting device extracts the operation object by comparing the plurality of images. The detection device detects at least one of a predetermined shape and a movement of the operation object that is extracted by the operation object extracting device. The signal output device outputs a signal to the target device, the signal corresponding to the at least one of the predetermined shape and the movement of the operation object detected by the detection device.

26 Claims, 10 Drawing Sheets

DIFFERENCE IMAGE

EDGE IMAGE

BALANCE POSITION

MOVEMENT OF AVERAGE BALANCE POSITION

INFORMATION DEVICE OPERATION APPARATUS

CROSS REFERENCE TO RELATED APPLICATION

This application is based on and incorporates herein by reference Japanese Patent Application No. 2007-92450 filed on Mar. 30, 2007.

BACKGROUND OF THE INVENTION

1. Field of the Invention

The present invention relates to an information device operation apparatus.

2. Description of Related Art

Conventionally, a safety operation system has been disclosed for operating an on-vehicle device, such as a vehicle navigation system, (see for example, JP-A-2005-63090). The safety operation system includes function selecting means for cyclically selecting one of multiple control targets every time a movement or a position of a certain finger, such as a thumb, relative to a palm is detected. Also, the safety operation system includes device operation means for providing the selected control target selected by the function selecting means with a control amount that is in proportional with a movement of the palm having a preset finger shape, such as a pointing shape.

In the safety operation system, by folding and unfolding the thumb while the other fingers are folded onto the palm to form a partially clenched fist, the multiple control target devices are cyclically selected. The above operation manner is performed as natural as if a push switch held by the palm is pushed by the thumb. As a result, the one of the multiple control target devices can be selected without difficulty or uneasiness, and thereby the operability is improved.

However, in the above safety operation system, a camera is provided above the operation object for capturing an image of a surface of the operation object, which surface receives extraneous light from outside. In the environment of the in-vehicle devices, the extraneous light widely changes, and thereby in the above structure, the luminance of the operation object widely changes. As a result, a hand region or an area corresponding to the hand is difficult to extract. Thus, the above difficulty may lead to an erroneous detection of the finger shape or hand movement.

Also, it is necessary to accurately detect an angle of the palm or a distance of the hand from the camera in a case, where the navigation map is operated by a three dimensional movement of the hand. In order to achieving the above accurate detection, the change in the luminance due to the distance or the angle may be detected by applying the illumination and capturing the image with the camera.

If the camera and a lighting equipment are provided on the ceiling in order to realize the above structure in a vehicle, the distance to the hand becomes relatively long. Thereby a stereo camera may be needed for detecting the change in the luminance that may correspond to the change in the angle of the hand. Thus, the device configuration may disadvantageously become complex.

SUMMARY OF THE INVENTION

The present invention is made in view of the above disadvantages. Thus, it is an objective of the present invention to address at least one of the above disadvantages.

According to an aspect of the present invention, an information device operation apparatus for extracting an operation object by image processing includes an image capturing device, an illumination device, control means, image storage means, operation object extracting means, detection means, and signal output means. The operation object is used for an operation of a target device. The image capturing device is disposed at a position for capturing an image of an opposite surface of the operation object opposite to a reception surface of the operation object. The reception surface receives extraneous light. The illumination device is disposed at a position for generating light that is applied to the opposite surface of the operation object. The control means controls the illumination device to generate the light under a plurality of luminance conditions. The control means controls the image capturing device to capture the image. The image storage means stores a plurality of images that are acquired by the image capturing device under a plurality of illumination intensity conditions. The plurality of illumination intensity conditions is caused by the illumination device that is controlled by the control means to generate the plurality of luminance conditions. The operation object extracting means extracts the operation object by comparing the plurality of images. The detection means detects at least one of a predetermined shape and a movement of the operation object that is extracted by the operation object extracting means. The signal output means outputs a signal to the target device, the signal corresponding to the at least one of the predetermined shape and the movement of the operation object detected by the detection means.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF PREFERRED EMBODIMENTS

Embodiments of the present invention will be described below referring to accompanying drawings. Note that, the embodiment of the present invention is not limited to the below described embodiments. However, the present invention may be applied to various embodiments provided that the embodiments falls within the range of the described technique.

First Embodiment

Figure 1:
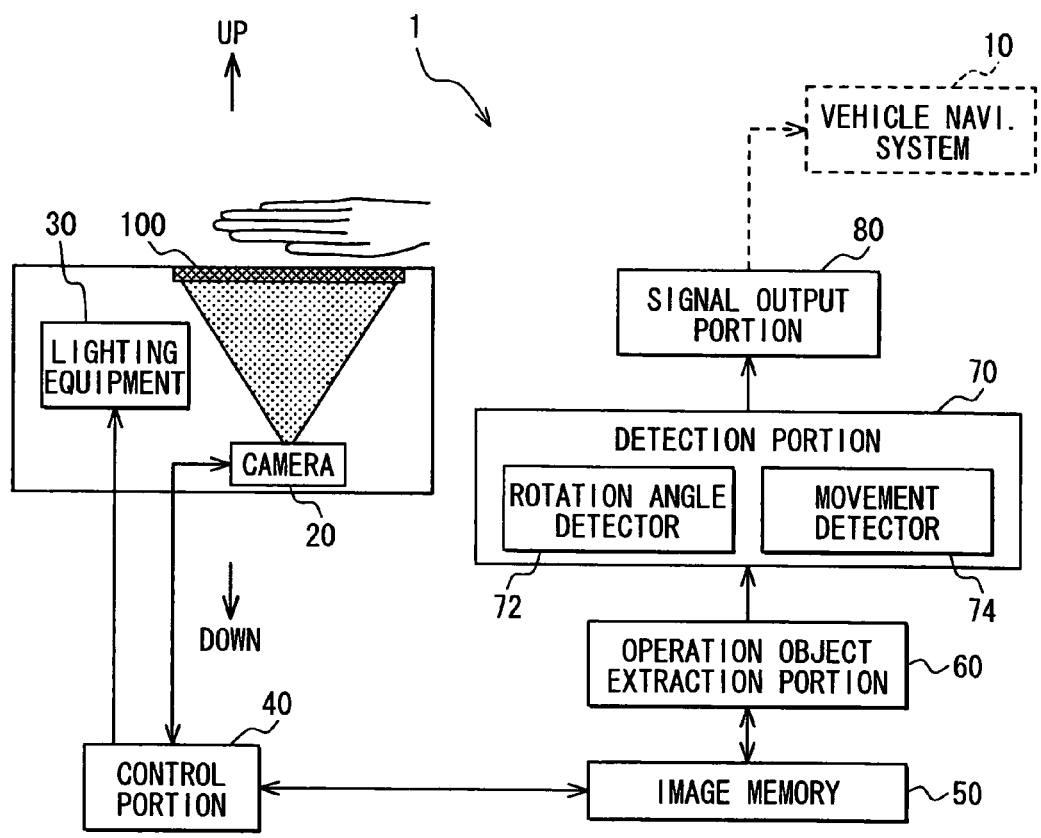
FIG. 1 is a block diagram illustrating a configuration of a vehicle navigation operation apparatus of the first embodiment of the present invention.

Firstly, a vehicle navigation operation apparatus 1 for operating a vehicle navigation system 10 is described referring to FIGS. 1 and 2. FIG. 1 is a schematic block diagram illustrating a configuration of the vehicle navigation operation apparatus 1, and FIGS. 2A to 2D are diagrams for explaining image processing for detecting a rotation angle, a movement direction, and a movement amount of the hand of the driver. The hand serves as an operation object.

As shown in FIG. 1, the vehicle navigation operation apparatus 1 extracts the hand of the driver by the image processing, the hand being used for operating the vehicle navigation system 10. The vehicle navigation operation apparatus 1 includes a camera 20, a lighting equipment 30, a control portion 40, an image memory 50, an operation object extraction portion 60, a detection portion 70, and a signal output portion 80.

The camera 20 is a small CCD camera or a CMOS camera and is located at a position for capturing an image of an opposite surface of the hand of the driver opposite to a surface of the hand receiving the extraneous light. In other words, the camera 20 is located below a touch sensitive panel 100 in FIG. 1.

The lighting equipment 30 is located at a position for applying light to the opposite surface of the hand of the driver opposite to the surface receiving the extraneous light. In other words, in FIG. 1, the lighting equipment 30 is located below the touch sensitive panel 100.

The control portion 40 controls luminance of the lighting equipment 30 and controls image acquisition by the camera 20 for acquiring or capturing the image. Typically, the control portion 40 controls multiple luminance conditions of the lighting equipment 30. For example, the control portion 40 turns on and off the lighting equipment 30. In other words, the control portion 40 controls the lighting equipment 30 to generate the light under the multiple luminance conditions and controls the camera 20 to capture the image.

The image memory 50 stores images acquired by the camera 20 under the multiple illumination intensity conditions, which are realized when the control portion 40 controls the lighting equipment 30 for the multiple luminance conditions as above. For example, the image memory 50 may be a RAM or a hard disk.

The operation object extraction portion 60 compares the stored images acquired under multiple illumination intensity conditions and extracts the hand of the driver by the image processing. Then, the detection portion 70 detects a predetermined shape and a predetermined movement of the hand of the driver extracted by the operation object extraction portion 60.

Figure 2A:
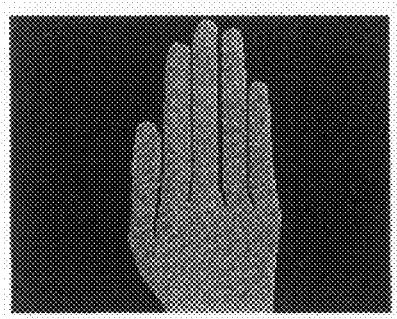
FIG. 2A is a diagram illustrating a difference image of a hand of a driver used in an image processing for detecting a rotation angle, a movement direction, and a movement amount of the hand.

Specifically, two images are acquired by the camera 20 under two illumination intensity condition of light and dark for generating a difference image as shown in FIG. 2A. Then, the hand of the driver is extracted from the above acquired difference image. The light generated by the lighting equipment 30 is reflected by the hand of the driver and is not reflected by other region other than the hand. When the hand of the driver is illuminated by two degree of the intensity of illumination, or is illuminated by high intensity and low intensity of illumination, a hand part of the image acquired under each of the above two conditions has a high degree of contrast due to a difference of the luminance. Here, the hand part of the image shows the image of the hand of the driver. As a result, based on the difference, the hand of the driver can be extracted.

The detection portion 70 detects a movement of the hand of the driver in two directions, which are orthogonal to each other, and which extend along a plane perpendicular to an optical axis of the camera 20. Specifically, the detection portion 70 detects the movement of the hand of the driver over the touch sensitive panel 100 and includes a rotation angle detector 72 and a movement detector 74. The rotation angle detector 72 detects the rotation angle of the hand of the driver above the touch sensitive panel 100, and the movement detector 74 detects a movement direction and a movement amount of the hand of the driver. For example, the rotation angle detector 72 detects the rotation angle of the hand of the driver relative to an image plane captured by the camera 20. The image plane extends generally perpendicularly to the optical axis of the camera 20.

Figure 2B:
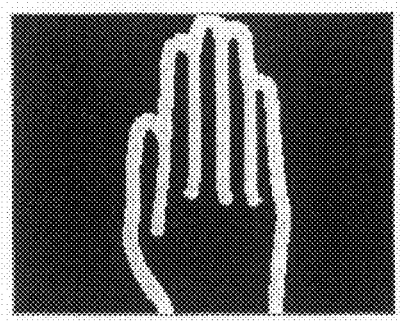
FIG. 2B is a diagram illustrating an edge image of the hand of the driver used in the image processing.

As shown in FIG. 2B, the rotation angle detector 72 employs a first order difference operator, such as Sobel operator, to acquire of a luminance gradient $D_x$ in an x direction and a luminance gradient $D_y$ in a y direction of each pixel for the extracted image stored in the image memory 50 (see FIG. 2A). Then, the rotation angle detector 72 detects an edge intensity and an edge direction using the following equations.

Edge Intensity: $(D_x^2+D_y^2)^{1/2}$

Edge Direction: $\tan^{-1}(D_y/D_x)$

Then, the rotation angle detector 72 detects an average direction of the high luminosity edges based on the edge direction of each pixel. Here, the high luminosity edge is a part of the detected edge having an luminosity intensity higher than a predetermined threshold value (see FIG. 2B). Then, the detected average edge direction is determined as an angle of the hand of the driver.

In the above case, "average edge direction" may correspond to an average value of the edge directions. However, "average edge direction" may be alternatively a mode or a median of the edge directions. Also, the edge direction may not be computed for each pixel, but the luminance gradients $D_x$ in the x direction and the luminance gradients $D_y$ in the y direction may be computed for the pixels having the edge intensity higher than a predetermined threshold value. Then, the luminance gradients $D_x$ and the luminance gradients $D_y$ are averaged to obtain average values for computing the average edge direction.

Figure 2C:
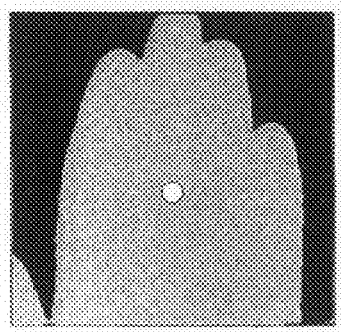
FIG. 2C is a diagram illustrating an image having a point-of-balance position in the image processing.
Figure 2D:
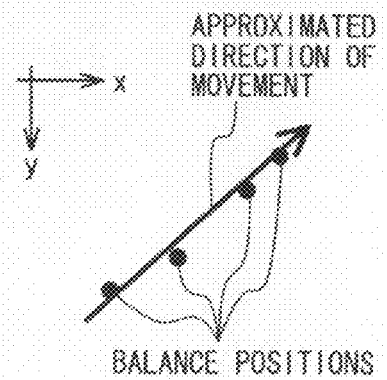
FIG. 2D is a diagram illustrating a movement of an average point-of-balance position in the image processing.

As shown in FIG. 2C, the movement detector 74 detects a point-of-balance position, which indicates a position of a point of balance of the hand of the driver, for each of the multiple extracted images (see FIG. 2A) stored in the image memory 50 in a chronological order or an in time-series order. Here, the point of balance of the hand may correspond to a center of the extracted hand. Then, as shown in FIG. 2D, the direction and the movement amount of the detected point-of-balance position of the hand of the driver, which are detected in time-series order, are determined as the movement direction and the movement amount of the hand of the driver. In other words, when the directions and the movement amounts of the point-of-balance position of the hand are compared in the time-series order, the direction and the movement amount of the hand are determined as shown in FIG. 2D. Also, an optical flow or a pattern matching may be alternatively employed for detecting the movement direction and the movement amount of the hand.

In the above case, the movement direction and the movement distance of the hand of the driver may be detected by approximating multiple point-of-balance positions through a linear approximation method or a linear approximation method for a two dimensional system. In the above method, noise is removed, and thereby the smooth movement of the hand of the driver is detected. As a result, the movement direction and the movement distance of the more smoothly moving hand are obtained.

The signal output portion 80 outputs to the vehicle navigation system 10 the rotation angle, the movement direction, and the movement amount of the hand of the driver. As above, the rotation angle is detected by the rotation angle detector 72 and the movement direction, and the movement amount are detected by the movement detector 74.

(Feature of Vehicle Navigation Operation Apparatus 1)

The above vehicle navigation operation apparatus 1 is limited from being influenced or affected by the extraneous light and is easily used in the operation of the target device through the movement of the hand of the driver. The vehicle navigation operation apparatus 1 is described below.

In the vehicle navigation operation apparatus 1, the camera 20 is located at a position, at which the camera 20 can capture the image of the opposite surface of the hand of the driver opposite to the surface of the hand that receives the extraneous light. In other words, the camera 20 captures the image of a shade side part of the hand of the driver. As a result, even when the intensity of illumination of the extraneous light changes, the intensity of illumination of the shade side part of the hand of the driver slightly changes. Thus, the vehicle navigation operation apparatus 1 is limited from being influenced by the extraneous light.

Also, the lighting equipment 30 is located such that the generated light is applied to the opposite surface of the hand of the driver opposite to the surface of the hand, which surface receives the extraneous light. As a result, the light is applied to the shade side part of the hand of the driver, the shade side part being made by the extraneous light. Thus, even when the intensity of illumination of the extraneous light changes, the intensity of illumination of the shade side part slightly changes.

Further more, the light is applied to the shade side part of the hand of the driver under the multiple illumination intensity conditions to capture the images, and the captured multiple images under the above conditions are stored. The multiple images are compared with each other to extract the hand of the driver. In other words, because the images of the hand of the driver are acquired under the different intensities of illumination, the contrast of the image of the hand of the driver is made clear. As a result, even when the extraneous light changes, the shape and the movement of the hand of the driver can be extracted with the limited influence of the light change.

Also, a signal that corresponds to the extracted shape and movement of the hand of the driver is outputted to a mobile object device. As a result, it is possible to operate the mobile object device if the mobile object device uses the signal for the operation of the mobile object device.

For example, in a case, where the vehicle navigation system 10 is configured to cause a display device to display an operation indication, the image of the hand of the driver may be superimposed on the operation indication. As a result, the operator visually recognizes or check the superimposed indication in the display device to operate the vehicle navigation system 10.

The vehicle navigation operation apparatus 1 detects the rotation and the movement of the hand of the driver above the touch sensitive panel 100. In other words, the vehicle navigation operation apparatus 1 detects the movement of the hand of the driver in two directions that are orthogonal to each other on an imaginary plane perpendicular to the optical axis of the camera 20. In the above, the imaginary plane corresponds to any image plane that is captured by the camera 20. As a result, the vehicle navigation operation apparatus 1 may be applied to the vehicle navigation system 10, and the rotation of the displayed map, the movement or displacement of the displayed map, or the enlargement of the displayed map may be easily performed. Also, the vehicle navigation operation apparatus 1 may easily adjust the sound volume in the above configuration.

Second Embodiment

The vehicle navigation operation apparatus 1 of the first embodiment outputs signals for operation of the vehicle navigation system 10 based on the movement of the hand of the driver above the touch sensitive panel 100, the movement being made in the two dimensional system or on a plane, for example. In contrast, a vehicle navigation operation apparatus 2 of the second embodiment is configured to operate the vehicle navigation system 10 based on the movement of the hand of the driver in a three dimensional space and is described referring to FIG. 3 and FIG. 4. Note that, because the vehicle navigation operation apparatus 2 has a similar structure similar to the vehicle navigation operation apparatus 1 of the first embodiment, components of the vehicle navigation operation apparatus 2 similar to the components of the vehicle navigation operation apparatus 1 are indicated by the same numerals, and the explanations thereof are omitted.

Figure 3:
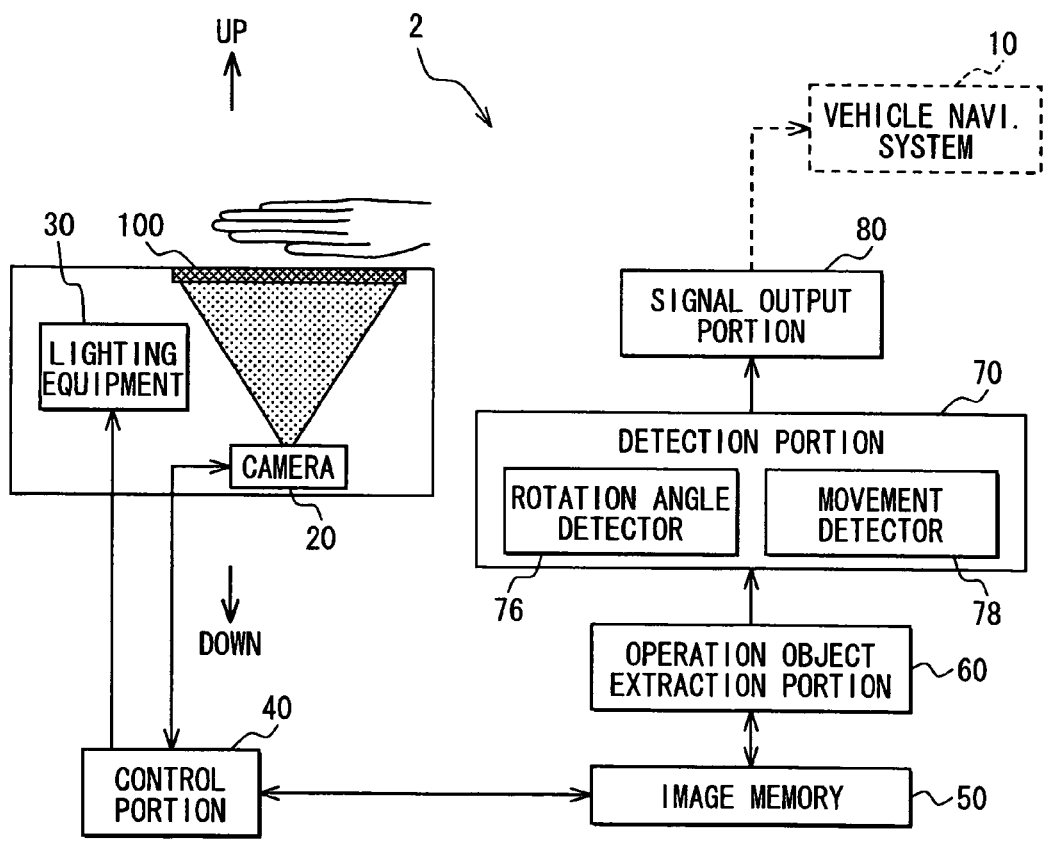
FIG. 3 is a block diagram illustrating a configuration of a vehicle navigation operation apparatus of the second embodiment of the present invention.

FIG. 3 is a schematic block diagram illustrating a configuration of the vehicle navigation operation apparatus 2, and FIGS. 4A to 4I are diagrams used for explaining a principle of space rotation angle detection.

In the vehicle navigation operation apparatus 2, the detection portion 70 detects the movement of the hand of the driver in the three dimensional space. Note that, the three dimensional space is define by the optical axis of the camera 20 and two axes that are orthogonal to each other on the imaginary plane perpendicular to the optical axis.

The detection portion 70 includes a space rotation angle detector 76 and a space movement detector 78. The space rotation angle detector 76 detects a three dimensional rotation angle of the hand of the driver, and the space movement detector 78 detects the movement direction and the movement amount of the hand of the driver in the three dimensional space.

The space rotation angle detector 76 divides the image of the hand of the driver extracted by the operation object extraction portion 60 into multiple regions. Then, the space rotation angle detector 76 detects an average luminance and a point-of-balance position for each divided region. Then, the space rotation angle detector 76 detects the three dimensional rotation angle of the hand of the driver based on the average luminance and the point-of-balance position for each detected region.

Figures 4A, 4B, 4C, 4D, 4E, 4F:
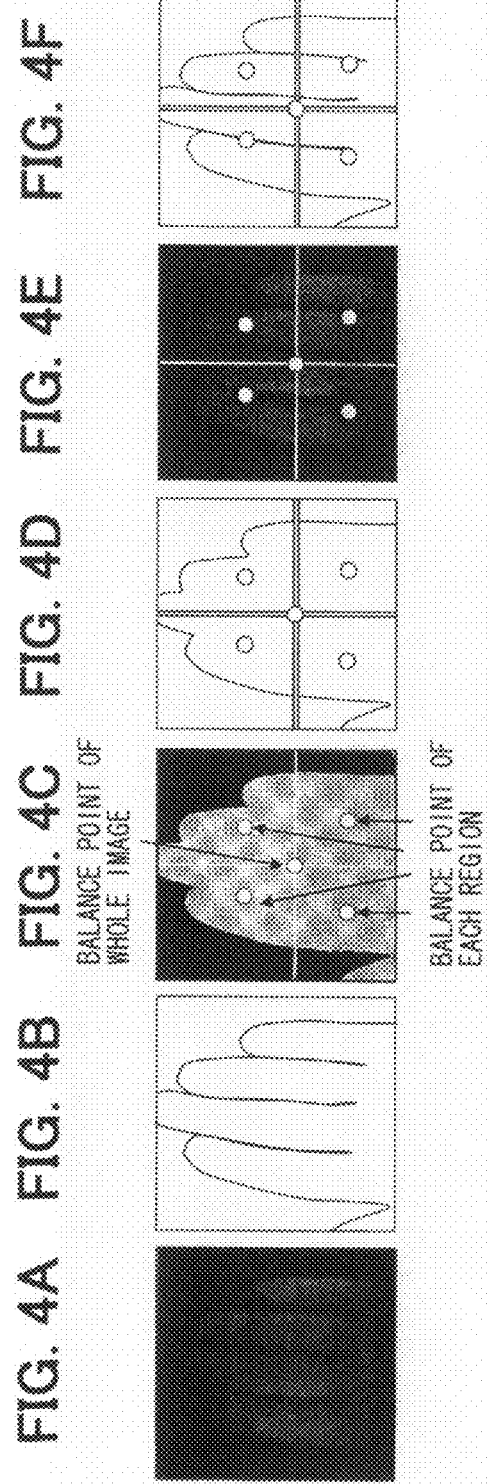
FIG. 4A is a diagram illustrating a difference image used in space rotation angle detection.
FIG. 4B is an outline drawing of the diagram in FIG. 4A.
FIG. 4C is a diagram illustrating a binarized image used in the space rotation angle detection.
FIG. 4D is an outline drawing of the diagram in FIG. 4C.
FIG. 4E is a diagram illustrating points of balance in divided regions.
FIG. 4F is an outline drawing of the diagram in FIG. 4E.
Figure 4G:
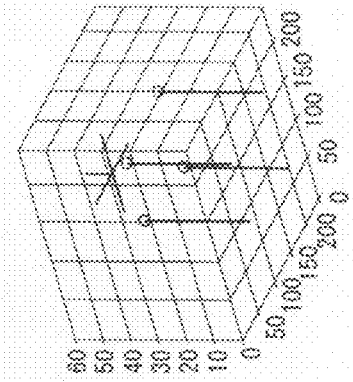
FIG. 4G is a diagram illustrating an average luminance of each region at the point of balance.

A method for dividing the hand of the driver, which is extracted from the image, into the multiple regions will be described below. The extracted image is acquired by the operation object extraction portion 60 as shown in FIG. 4A. Then, the point of balance of the extracted image of the hand is acquired, and the extracted image of the hand of the driver is divided along lines, which are orthogonal to each other, and which passes through the acquired point of balance as shown in FIG. 4C.

Note that "three dimensional rotation angle" corresponds to angles, each of which is measured around three axes that define the three dimensional space, for example. The three axes are the optical axis of the camera 20 and the two axes that are orthogonal to each other on a plane perpendicular to the optical axis. As above, the three dimensional rotation angle is an angle measured about a rotation axis associated with the hand of the driver in the three dimensional space.

The space movement detector 78 detects the average luminance value of the region of the hand of the driver, which is extracted by the operation object extraction portion 60, at predetermined time intervals. Then, the space movement detector 78 detects a vertical movement of the hand of the driver, or a movement of the hand in a direction of the optical axis of the camera 20, by comparing the above detected multiple average luminance values.

The signal output portion 80 outputs (a) the three dimensional rotation angle of the hand of the driver, which is detected by the space rotation angle detector 76, and (b) the movement direction and the movement amount of the hand of the driver in the space, which are detected by the space movement detector 78.

(Detection Processing)

Next, the detection processing executed by the detection portion 70 will be described referring to FIG. 5, FIG. 6, and FIG. 7.

Figure 5:
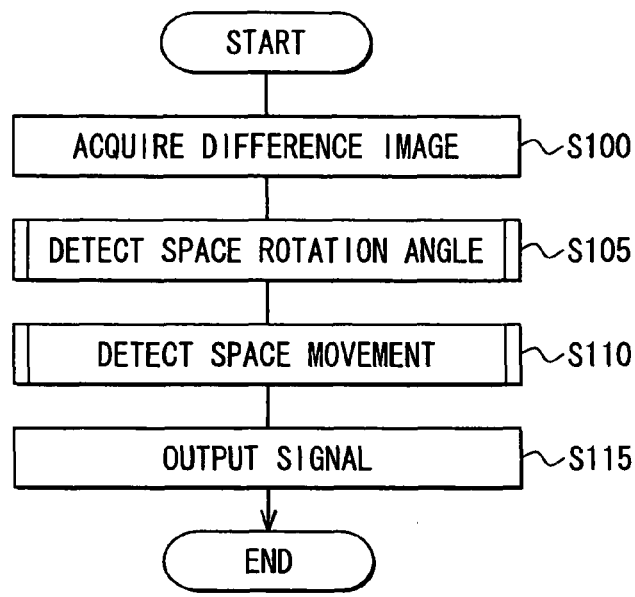
FIG. 5 is a flow chart for detection processing.
Figure 6:
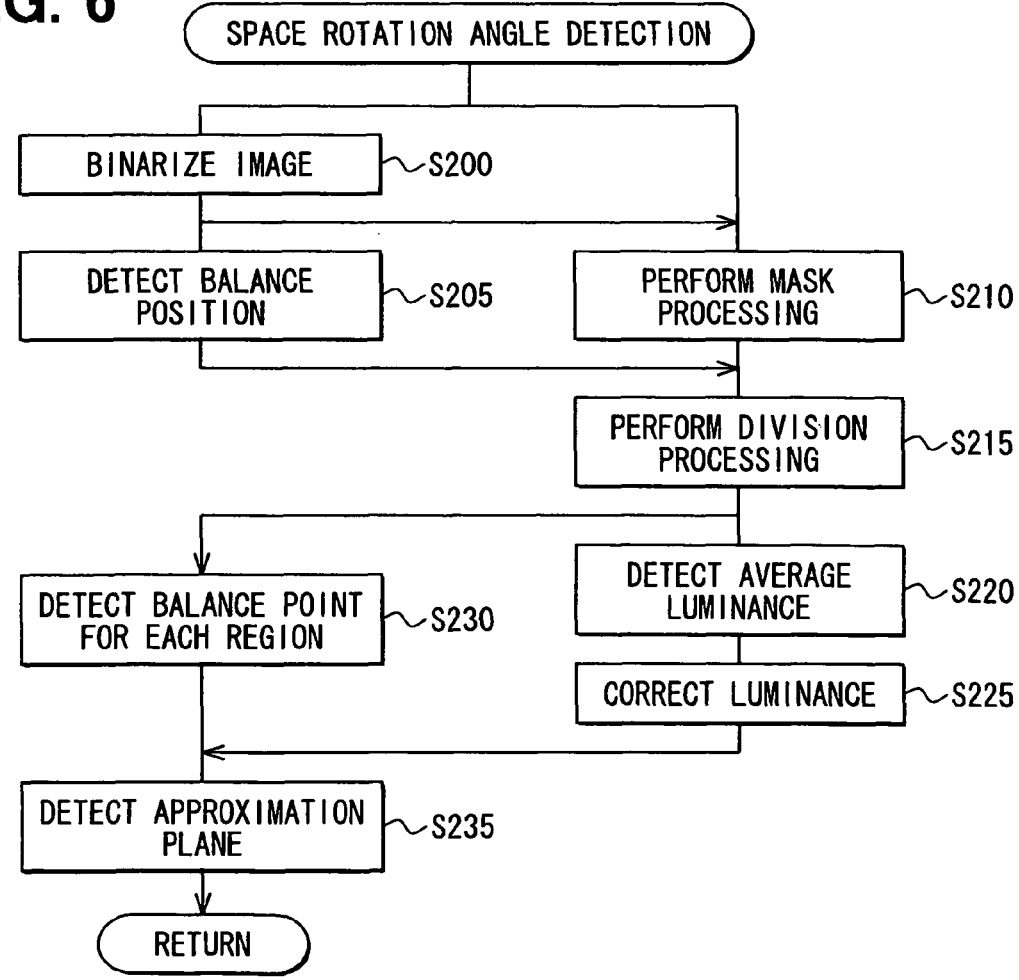
FIG. 6 is a flow chart of a subroutine for space rotation angle detection.
Figure 7:
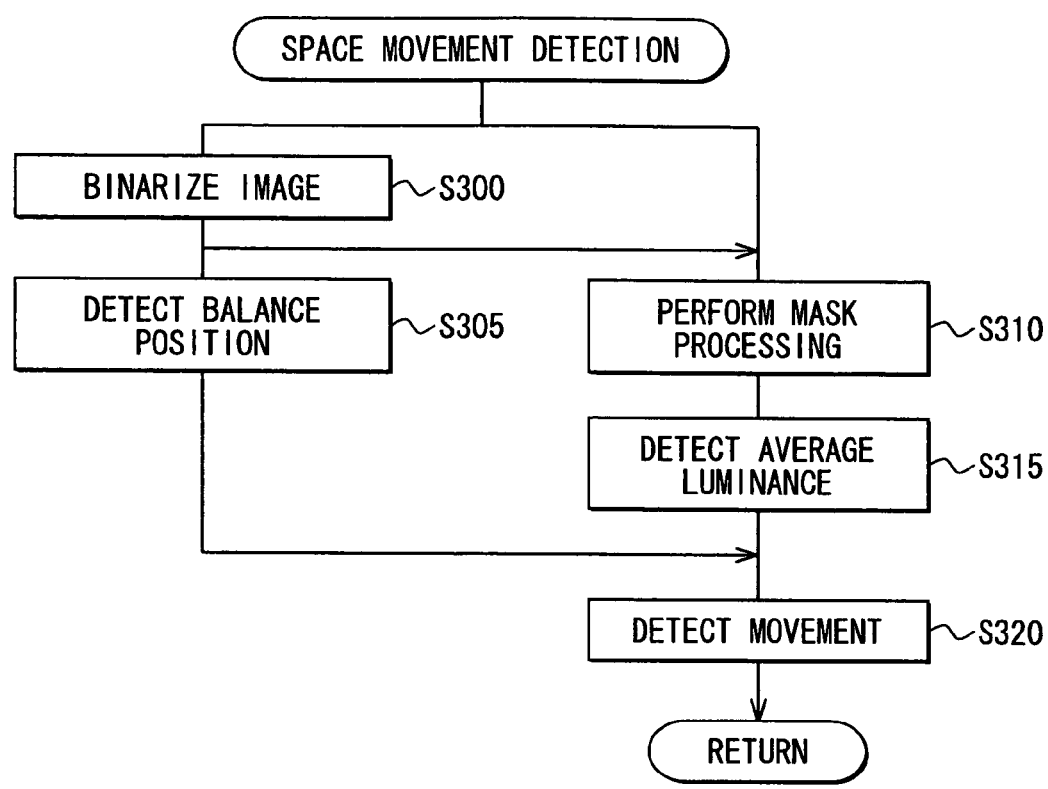
FIG. 7 is a flow chart of a subroutine for space movement detection.

FIG. 5 is a flow chart for the detection processing, FIG. 6 is a flow chart of a subroutine for space rotation angle detection, and FIG. 7 is a flow chart of a subroutine for space movement detection.

In the detection processing, as shown in FIG. 5, the difference image of the hand of the driver acquired by the operation object extraction portion 60 is obtained at S100.

The space rotation angle is detected at S105, and the space movement is detected at S110. Then, at S115, the space rotation angle detected at S105 and the space movement direction and the movement amount detected at S110 are outputted to the vehicle navigation system 10.

(Space Rotation Angle Detection Processing)

In the space rotation angle detection processing, as shown in FIG. 6, the difference image acquired at S100 (see FIG. 4A) is binarized at S200.

The point-of-balance position of the difference image binarized at S200 is detected at S205 (see FIG. 4C).

At S210, the difference image binarized at S200 is processed through a mask processing such that the image of the hand of the driver is extracted from the difference image.

At S215, the image of the hand of the driver extracted at S210 is divided into four image regions along two straight lines (see FIG. 4C). The above two lines are orthogonal to each other and go through the point-of-balance position of the difference image detected at S205.

Figure 4H:
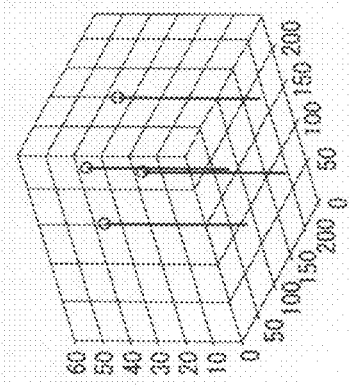
FIG. 4H is a diagram illustrating a corrected average luminance of each region.
Figure 4I:
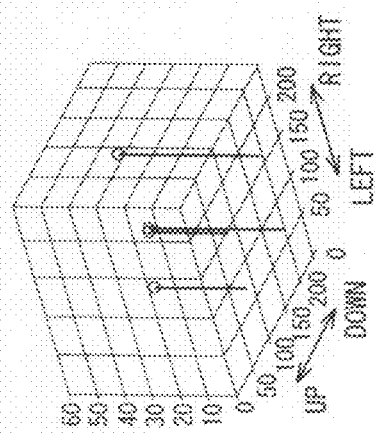
FIG. 4I is a diagram illustrating a process for detecting an approximation plane.

At S220, the average luminance for each of the above divided regions is detected (see FIG. 4G), and at S225, the average luminance detected at S220 is corrected using a predetermined constant (see FIG. 4H).

At S230, the point of balance for each region, which is made by dividing the image of the hand of the driver at S215, is detected (see FIG. 4E).

At S235, an approximation plane is detected based on (a) the point of balance for each region detected at S230 and (b) the average luminance for each region corrected at S225. Then, the space rotation angle of the hand of the driver is detected based on the detected approximation plane (see FIG. 4I).

The approximation plane is detected in the method of a plane fitting process using the inverse of the average luminance for each region and the point of balance of the each region. In other words, the inverse of the average luminance at each point of balance of the all regions are approximated to detect the approximation plane using the least squares method. After the approximation plane is detected at S235, the space rotation angle detection processing is finished.

(Space Movement Detection Processing)

In the space movement detection processing, as shown in FIG. 7, the difference image acquired at S100 (see FIG. 4A) is binarized at S300.

The point-of-balance position of the difference image, which has been binarized at S300, is detected at S305 (see FIG. 4C).

Also, at S310, the difference image, which has been binarized at S300, is processed through the mask processing such that the image of the hand of the driver is extracted from the difference image. Then, the average luminance of the extracted image of the hand of the driver at S310 is detected at S315.

The movement direction and the movement amount of the hand of the driver is detected at S320 based on (a) the point-of-balance position of the difference image detected at S305 and (b) the average luminance of the region of the hand of the driver detected at S315.

Firstly, the square root of the inverse of a latest average luminance value of the latest image of the hand of the driver is acquired. Also, the square root of the inverse of a previous average luminance value of the previous image of the hand of the driver is acquired. Here, the previous image is captured a certain time period before the latest image is captured. The movement direction and the movement amount is computed by taking the difference between (a) the square root of the inverse of the latest average luminance value and (b) the square root of the inverse of the previous average luminance value. Then, a latest point-of-balance position of the latest image of the hand of the driver and a previous point-of-balance position of the previous image of the hand of the driver are acquired. The movement direction and the movement amount of the hand of the driver is computed by taking the difference between (a) the latest point-of-balance position and (b) the previous point-of-balance position. After the above detection, the space movement processing is finished.

In the above case, the movement direction and the movement amount of the hand of the driver may be more accurately detected by approximating movement directions and movement amounts through a method, such as a linear approximation, a linear approximation for a two dimensional system. Due to the above approximation, noise is removed, and thereby the smooth movement of the hand of the driver is detected. As a result, the movement direction and the movement distance of the more smoothly moving hand are obtained.

(Feature of Vehicle Navigation Operation Apparatus 2)

As above, the image captured by the camera 20 is processed, and the rotation angle of the hand of the driver in the three dimensional space, or the three dimensional rotation angle of the hand, is detected. Also, the movement direction and the movement amount are detected. As a result, more information items can be acquired compared with a case, where the movement of the hand is detected on the two dimensional surface or on the imaginary plane.

Thus, it is possible to perform more complex operations of the vehicle navigation system 10 based on the detected movement of the hand of the driver in the three dimensional space.

Third Embodiment

Next, a vehicle navigation operation apparatus 3 will be described referring to FIGS. 8A and 8B. Note that in the vehicle navigation operation apparatus 3, the movement of the hand of the driver is detected by a distance sensor but not by the camera for capturing the image. Note that, the vehicle navigation operation apparatus 3 has a similar structure similar to the vehicle navigation operation apparatus 2 of the first embodiment. Thus, components of the vehicle navigation operation apparatus 3 similar to the components of the vehicle navigation operation apparatus 2 are indicated by the same numerals, and the explanations thereof are omitted.

Figure 8A:
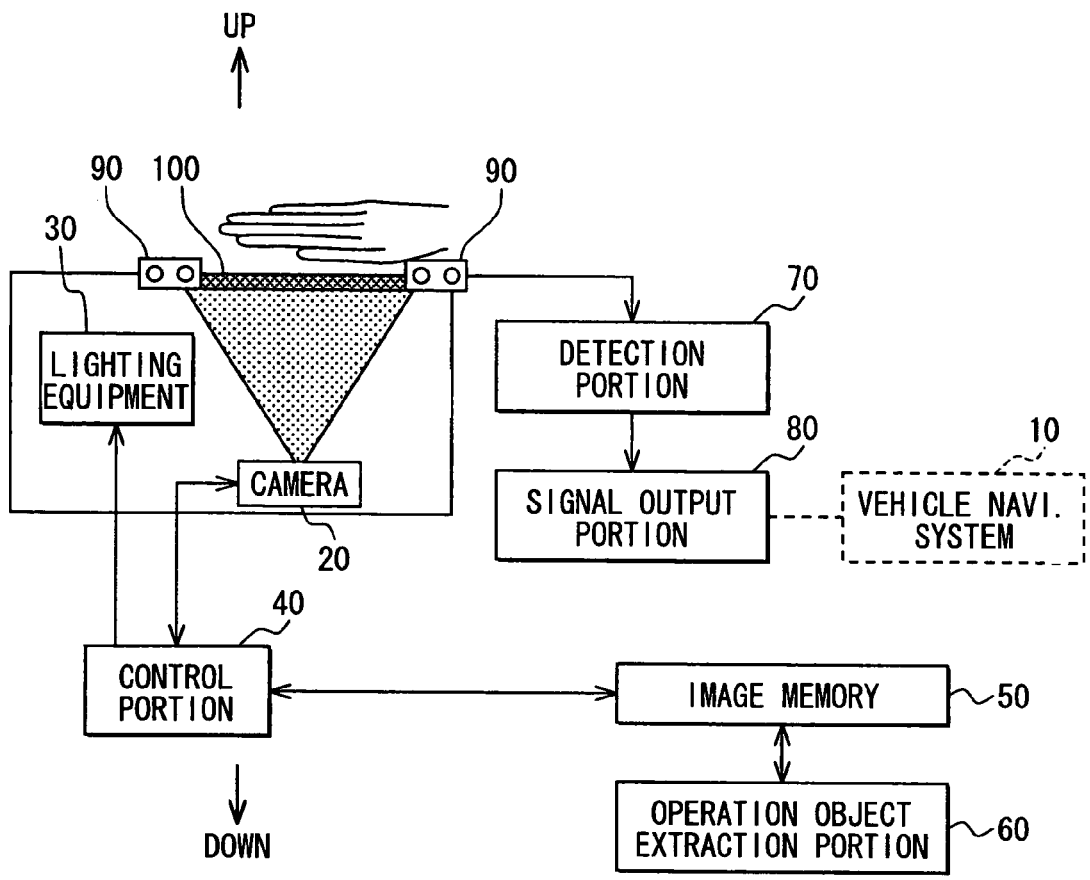
FIG. 8A is a block diagram illustrating a configuration of a vehicle navigation operation apparatus of the third embodiment of the present invention.
Figure 8B:
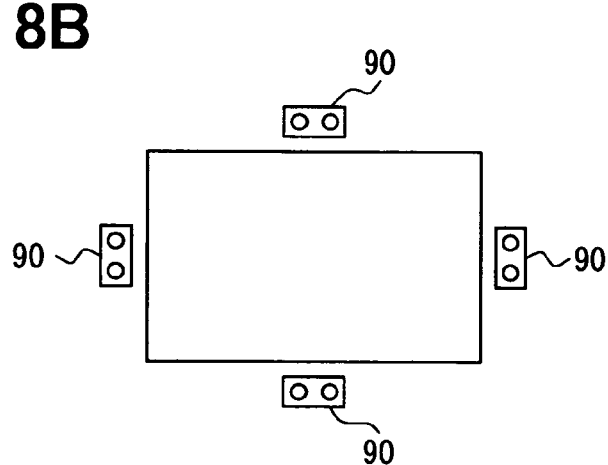
FIG. 8B is a top view of a touch sensitive panel and distance sensors of the vehicle navigation operation apparatus of the third embodiment.

FIG. 8A is a schematic block diagram illustrating a configuration of the vehicle navigation operation apparatus 3. As shown in FIG. 8B, the vehicle navigation operation apparatus 3 includes ultrasonic wave distance sensors 90 having directivity at four corners of the touch sensitive panel 100.

The space rotation angle detector 76 detects a three dimensional angle of the hand of the driver based on the distance acquired from the four ultrasonic wave distance sensors 90.

In other words, because each of the four ultrasonic wave distance sensors 90 has directivity (or the ultrasonic wave distance sensor 90 emits the light that has directivity), the distances measured by the four ultrasonic wave distance sensors 90 indicate distances to four different points of the hand of the driver. As a result, by approximating the measured four distances using the least squares method, a plane or surface can be defined, and the above defined plane is named as an approximation plane.

If the angle measured around each of the axes of the three dimensional system is acquired in accordance with a gradient of the approximation plane, the three dimensional rotation angle of the hand of the driver is acquired.

Also, the space movement detector 78 detects the movement direction and the movement amount of the driver in the three dimensional space. The movement direction and the movement amount in the direction of the optical axis of the camera 20 in the three dimensional space can be detected by detecting the movement of the above approximation plane in the up-down direction. The up-down direction corresponds to the direction of the optical axis in FIG. 8A.

Also, the movement in the direction parallel to the plane, on which the touch sensitive panel 100 extends, can be detected based on the time-series difference between the distances detected by the ultrasonic wave distance sensors 90. In the above, the distance sensor may be an optical sensor or a radio sensor.

Fourth Embodiment

Next, a vehicle navigation operation apparatus 4 will be described referring to FIGS. 9A to 9C. The vehicle navigation operation apparatus 4 detects the three dimensional rotation angle and the movement of the hand of the driver by using baffle means having an opening. Note that, the vehicle navigation operation apparatus 4 has a similar structure similar to the vehicle navigation operation apparatus 1 of the first embodiment. Thus, similar components of the vehicle navigation operation apparatus 4 of the present embodiment similar to the components of the vehicle navigation operation apparatus 1 of the first embodiment are indicated by the same numerals, and the explanations thereof are omitted.

Figure 9A:
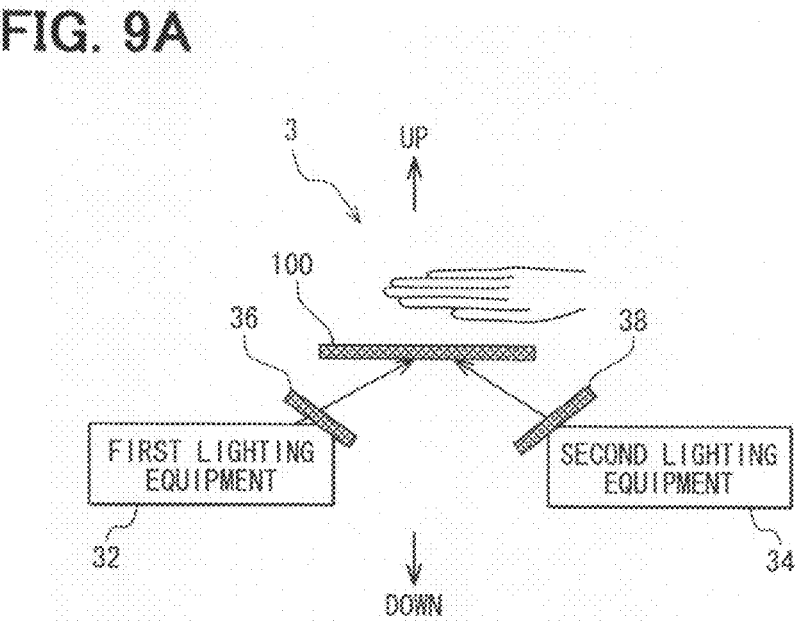
FIG. 9A is a block diagram illustrating a configuration of a vehicle navigation operation apparatus of the fourth embodiment of the present invention.

The vehicle navigation operation apparatus 4 includes a first lighting equipment 32, a second lighting equipment 34, a first baffle plate 36, and a second baffle plate 38 as shown in FIG. 9A.

The second lighting equipment 34 is located at a position to oppose to the first lighting equipment 32 as shown in FIG. 9A.

The first baffle plate 36 is located between the first lighting equipment 32 and the hand of the driver and includes an opening. The first baffle plate 36 causes part of the light from the first lighting equipment 32 to be projected on the operation object through the opening.

The second baffle plate 38 is located between the second lighting equipment 34 and the hand of the driver and includes the opening. The second baffle plate 38 causes part of the light from the second lighting equipment 34 to be projected on the operation object through the opening.

The first baffle plate 36 and the second baffle plate 38 are arranged such that the light applied through the opening of the first baffle plate 36 intersects the light applied through the opening of the second baffle plate 38 at a position that is a predetermined distance away from the camera 20.

The space rotation angle detector 76 detects the lights projected on the hand of the driver through openings of the first baffle plate 36 and the second baffle plate 38 based on the image inputted by the camera 20. Then, the lights projected on the hand of the driver through the openings of the first baffle plate 36 and the second baffle plate 38 are used such that the space rotation angle of the hand of the driver is detected based on a distance from the touch sensitive panel 100 that is a predetermined distance away from the camera 20.

In other words, the light applied through the opening of the first baffle plate 36 and the light applied through the opening of the second baffle plate 38 are applied to the hand of the driver. The light applied through the opening of each baffle plate to the hand of the driver crosses the other light at a position on the hand of the driver on the touch sensitive panel 100.

Figure 9B:
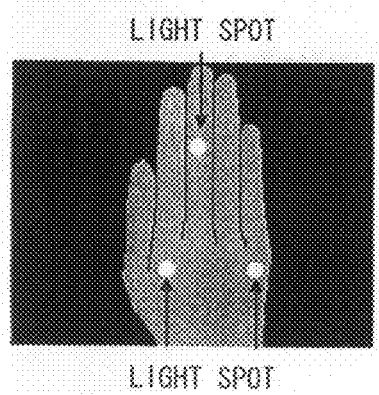
FIG. 9B is a diagram illustrating an image of the hand in a condition, where the hand touches the touch sensitive panel.

Thus, if the hand of the driver contacts the touch sensitive panel 100, the slit light projected through the opening of the first baffle plate 36 and the slit light projected through the opening of the second baffle plate 38 overlaps with each other on the surface of the hand of the driver to form a light spot as shown in FIG. 9B.

If the hand of the driver is positioned away from the touch sensitive panel 100, two light spots appear on the surface of the hand of the driver. Also, when the hand of the driver is inclined, a distance between the light spots that appear on the surface of the hand of the driver, changes with the degree of the inclination of the hand.

Figure 9C:
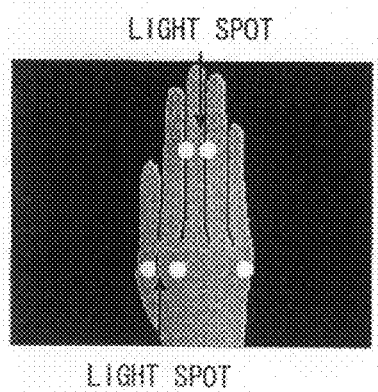
FIG. 9C is a diagram illustrating an image of the hand in another condition, where the hand is spaced from the touch sensitive panel.

In other words, as shown in FIG. 9C, when the inclination becomes larger, a distance between one end of the hand of the driver and the touch sensitive panel 100 is different from another distance between another end of the hand and the touch sensitive panel 100. If the difference between the above two distances is small, the distance between the light spots on the operation object surface is small. If the difference between the above two distances is large, the distance between the light spots is large. FIG. 9C shows an example of the inclination of the hand relative to the touch sensitive panel 100. In FIG. 9C, the thumb side of the hand is tilted to be away from the touch sensitive panel 100.

As above, if the hand of the driver is inclined or tilted, the distance between two light spots on the surface of the hand of the driver changes. As a result, by detecting the distance between the two light spots on the surface of the hand of the driver, the three dimensional rotation angle of the hand of the driver can be detected.

Further, by detecting a size of the light spot on the surface of the hand of the driver, the distance to the hand of the driver is detected.

As above, when the hand of the driver is on the touch sensitive panel 100, the light is applied or projected to one spot on the hand of the driver. In other words, in the above case, a single light spot appears on the operation object surface. In contrast, when the hand of the driver is positioned away from the touch sensitive panel 100 by a distance more than a predetermined distance, two light spots appear on the surface of the hand of the driver.

When the distance from the touch sensitive panel 100 to the hand of the driver becomes large and small, the distance between the above two light spots becomes large and small in proportion to the above distance to the hand. Also, although the size of the two light spots changes, a ratio of the size of one of the two light spots to the size of the other remains constant.

When the distance between the two light spots and the size ratio of the two light spots are detected, the distance to the hand of the driver is detected.

Also, instead of the above combination of the lighting equipment and the baffle plate, an alternative lighting equipment having a high directivity may be employed such that the light is applied to a narrow area.

Fifth Embodiment

Next, a vehicle navigation operation apparatus 5 for operating the vehicle navigation system 10 based on a shape of the hand of the driver will be described.

The vehicle navigation operation apparatus 5 has a similar structure similar to the vehicle navigation operation apparatus 1, and thereby the explanation of the vehicle navigation operation apparatus 5 is omitted. In the vehicle navigation operation apparatus 5, predetermined pattern images of the hand of the driver are stored in the image memory 50. For example, the pattern images includes a shape of a clenched fist of the driver, a shape of a partially clenched fist with one or more fingers projecting, an O-shape formed with a forefinger and a thumb, and a certain shape of the hand intentionally formed by the driver.

Also, the detection portion 70 compares the pattern images stored in the image memory 50 and the image of the hand of the driver extracted by the operation object extraction portion 60. When a shape indicated by one of the pattern images is identical with or most similar to the shape of the hand of the driver, the detection portion 70 determines that the hand of the driver has the predetermined shape.

The signal output portion 80 outputs an output signal that corresponds to the predetermined shape of the hand of the driver detected by the detection portion 70. For example, when the hand of the driver has a clenched-fist shape or when the driver folds his fingers onto the palm, the signal output portion 80 may output the signal for stopping the operation to the vehicle navigation system 10. Also, the signal output portion 80 may output the signals for various commands to the vehicle navigation system 10 in accordance with the number of the projecting fingers.

As above, if the hand of the driver has the predetermined shape, the output signal is outputted in accordance with the above shape. The above operation is made possible by the pattern matching, which is easily executed. As a result, in the vehicle navigation system 10, if a certain operation is preset to correspond to the output signal, the driver can cause the certain operation to be performed for the vehicle navigation system 10 through a simple operation.

Sixth Embodiment (1) There is provided the touch sensitive panel 100 that detects a push down of a part of the touch sensitive panel 100. The part corresponds to an operation switch. The signal output portion 80 is configured to output a signal correspondingly to an operational state of the operation switch detected by the touch sensitive panel 100 when the hand of the driver has the predetermined shape and movement.

In the above configuration, even when (a) a certain motion of the hand, such as the rotation and the movement, and (b) a certain shape of the hand are detected in the sixth embodiment, various signals may be outputted in accordance with the operational state of the operation switch. In contrast, only the predetermined signal may be outputted when (a) the certain motion and (b) the certain shape of the hand are similarly detected in the first to fifth embodiments. As a result, the vehicle navigation system 10 performs different operations in the sixth embodiment different from the operations in the first to fifth embodiments.

(2) In the second embodiment, the point of balance of the hand of the driver is acquired based on the difference image acquired by the operation object extraction portion 60. Then, the difference image is divided along the two lines, which pass through the acquired point of balance, and which are orthogonal to each other. In the above divisional method, one of the two lines may not extend in a finger direction, in which the finger of the hand of the driver extends. Also, the other one may not extend in a direction orthogonal to the finger direction. In other words, the two lines may extend in any directions provided that the two lines are orthogonal to each other. For example, the two line may be indicated as shown in FIG. 10C.

Figure 10A:
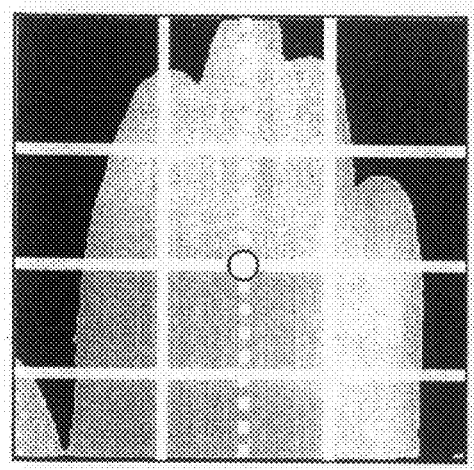
FIG. 10A is a diagram for explaining an alternative division method for dividing an image of the hand of the driver.
Figure 10B:
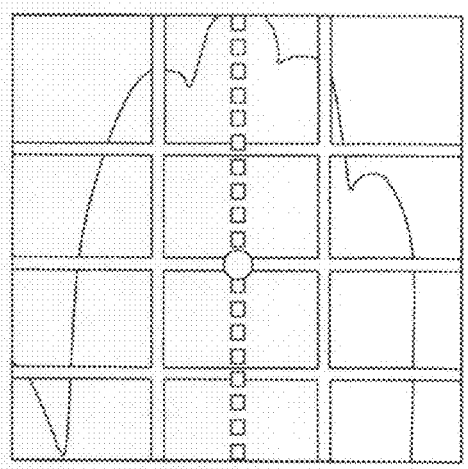
FIG. 10B is an outline drawing of the diagram in FIG. 10A.
Figure 10C:
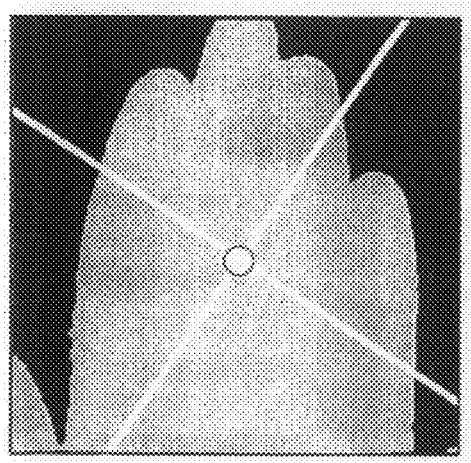
FIG. 10C is a diagram for explaining another alternative division method for dividing the image of the hand of the driver.
Figure 10D:
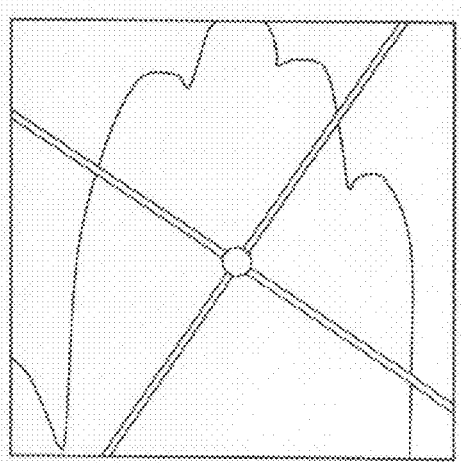
FIG. 10D is an outline drawing of the diagram in FIG. 10C.

Also, another division method is shown in FIG. 10A. Specifically, the image of the hand of the driver extracted by the operation object extraction portion 60 may be divided into the multiple regions by multiple lines. In other words, the point of balance of the hand of the driver is acquired first, and then, parallel lines, which are parallel to a line that passes through the acquired point of balance, are acquired. Also, orthogonal lines, which are orthogonal to the parallel lines, are acquired. Then, the image may be divided along the above parallel lines and orthogonal lines.

Other Embodiment

In the above first to sixth embodiments, the vehicle navigation system 10 is operated by the information device operation apparatus (the vehicle navigation operation apparatus 1 to 5). An information device operation apparatus 6 may be used for remotely operating an information device, such as a personal computer 12.

Figure 11:
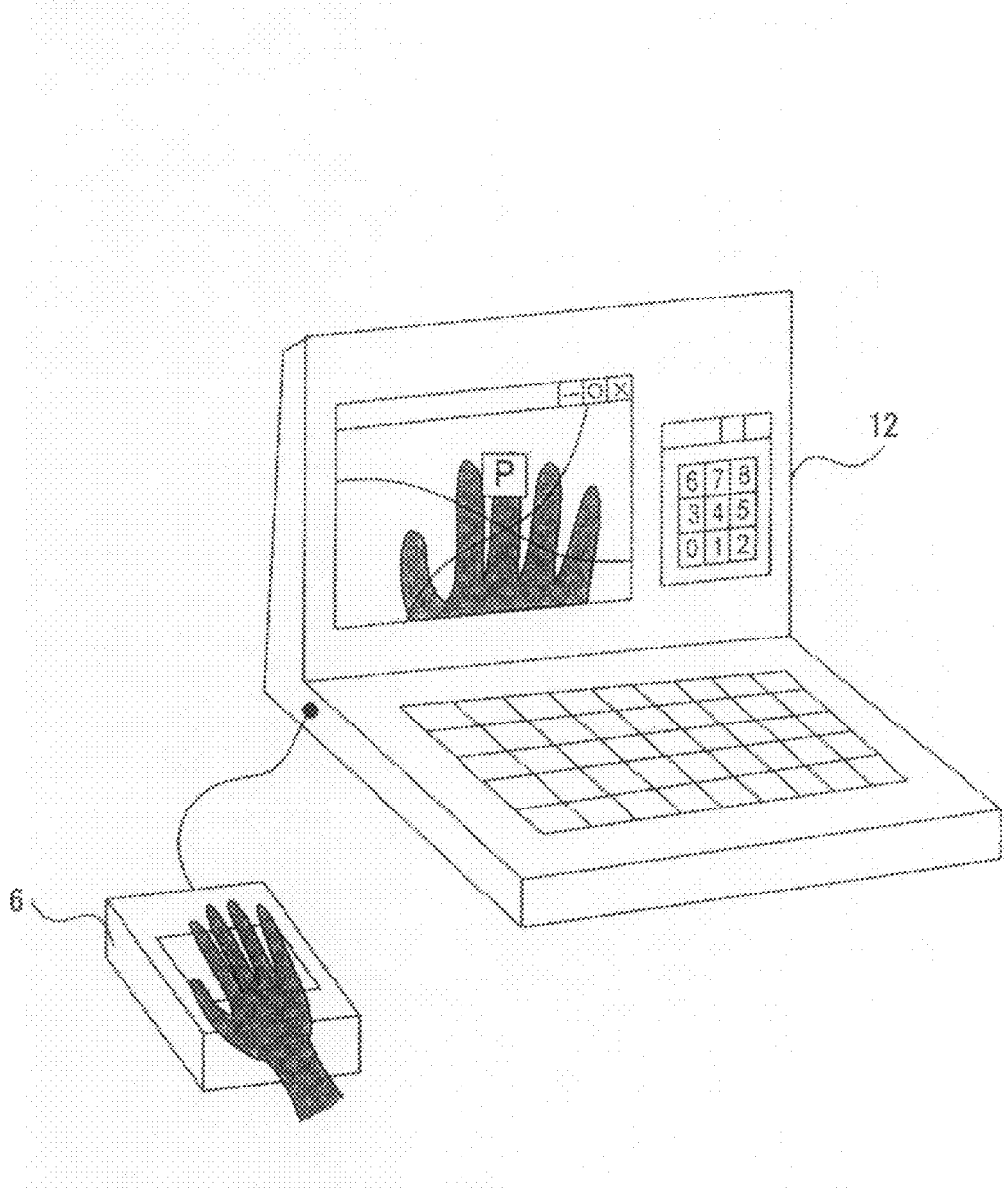
FIG. 11 a diagram illustrating a state, where the information device operation apparatus is applied to a personal computer.

In the above case, as shown in FIG. 11, the information device operation apparatus 6, which is placed on a desk, is connected with the personal computer 12. In the above structure, the operation of the push-down position and of the region of the extracted image of the hand may work with the operation in the screen of software operated in the personal computer 12. Above software includes map display software or an electric calculator, for example.

In the above embodiments, the inclination or tilt of the hand in the three dimensional space is detected by the information device operation apparatus. The inclination may be measured relative to the optical axis of the camera 20, for example.

In the above embodiment, the edge direction of each pixel means a direction of gradient of the luminance and is detected using a first order difference operator, such as Sobel operator.

The average direction of the edge is detected based on the above edge direction of each pixel. For example, the average value of the edge of each pixel is computed to detect a direction provided that it falls in a range between 0 to 180°. The detected direction is determined as the average direction of the edge.

The three dimensional rotation angle is detected in the above embodiment. In the above case, if the vehicle navigation system causes the three dimensional map to be displayed, a view point for observing the three dimensional map may be moved in the three dimensional space, for example.

In the above embodiment, for example, if the first illumination device 32 and the second illumination device 34 employ the lighting equipments having high directivity, the light spots have clear shapes. Thus, the three dimensional rotation angle of the operation object is further accurately detected. A laser diode may be employed for the illumination device.

If the baffle devices are used as in the above embodiment, the three dimensional rotation angle of the operation object is accurately detected without using the lighting equipment having high directivity, such as the laser diode.

In the above embodiment, the target device that is operated by the information device operation apparatus may be a device for a mobile object or may be an information device, such as a vehicle navigation system.

Additional advantages and modifications will readily occur to those skilled in the art. The invention in its broader terms is therefore not limited to the specific details, representative apparatus, and illustrative examples shown and described.

What is claimed is:

1. An information device operation apparatus for extracting an operation object by image processing, wherein the operation object is used for an operation of a target device, the information device operation apparatus comprising:
an image capturing device that is disposed at a position for capturing an image of an opposite surface of the operation object opposite to a reception surface of the operation object, the reception surface receiving extraneous light;
an illumination device that is disposed at a position for generating light that is applied to the opposite surface of the operation object;
control means for controlling the illumination device to generate the light under a plurality of luminance conditions, the control means controlling the image capturing device to capture the image;
image storage means for storing a plurality of images that are acquired by the image capturing device under a plurality of illumination intensity conditions, the plurality of illumination intensity conditions being caused by the illumination device that is controlled by the control means to generate the plurality of luminance conditions;
operation object extracting means for extracting the operation object by comparing the plurality of images;
detection means for detecting at least one of a predetermined shape and a movement of the operation object that is extracted by the operation object extracting means; and
signal output means for outputting a signal to the target device, the signal corresponding to the at least one of the predetermined shape and the movement of the operation object detected by the detection means.

2. The information device operation apparatus according to claim 1, wherein the detection means detects the movement of the operation object on an imaginary plane that is perpendicular to an optical axis of the image capturing device.

3. The information device operation apparatus according to claim 1, wherein:
the detection means includes rotation angle detection means for detecting a rotation angle of the operation object with respect to an imaginary plane that is perpendicular to an optical axis of the image capturing device; and
the signal output means outputs the rotation angle of the operation object detected by the rotation angle detection means.

4. The information device operation apparatus according to claim 3, wherein:
the operation object extracting means causes the image storage means to store an extracted image of the operation object indicating an extract result; and
the rotation angle detection means detects an edge direction of each pixel of the extracted image stored in the image storage means, the rotation angle detection means detecting an average edge direction based on the detected edge directions, the rotation angle detection means determining the detected average edge direction as the rotation angle of the operation object.

5. The information device operation apparatus according to claim 1, wherein:
the detection means includes movement detection means for detecting a movement direction and a movement amount of the operation object in two directions that are orthogonal to each other on an imaginary plane, the imaginary plane being perpendicular to an optical axis of the image capturing device; and the signal output means outputs the movement direction and the movement amount of the operation object detected by the movement detection means.

6. The information device operation apparatus according to claim 5, wherein:

the movement detection means detects a point-of-balance position of the operation object extracted by the operation object extracting means; and the movement detection means detects the movement direction and the movement amount of the operation object based on the detected point-of-balance position of the operation object.

7. The information device operation apparatus according to claim 1, wherein the signal output means is configured to output at least one of a rotation angle, a movement direction, and a movement amount of the operation object detected by the detection means.

8. The information device operation apparatus according to claim 1, wherein:

the detection means detects the movement of the operation object in a three dimensional space that is defined by an optical axis of the image capturing device and two axes that are orthogonal to each other on an imaginary plane, the imaginary plane being perpendicular to an optical axis of the image capturing device.

9. The information device operation apparatus according to claim 8, wherein:

the detection means includes space rotation angle detection means for detecting a three dimensional rotation angle of the operation object in the three dimensional space, the three dimensional rotation angle indicating an angle measured about a rotation axis associated with the operation object in the three dimensional space; and the signal output means outputs the three dimensional rotation angle of the operation object detected by the space rotation angle detection means.

10. The information device operation apparatus according to claim 9, wherein:

the space rotation angle detection means divides the extracted operation object into a plurality of regions, the extracted operation object being extracted by the operation object extracting means;

the space rotation angle detection means detects an average luminance and a point-of-balance position for each of the plurality of regions; and the space rotation angle detection means detects the three dimensional rotation angle of the operation object based on the detected average luminance and the detected point-of-balance position for the each of the plurality of regions.

11. The information device operation apparatus according to claim 10, wherein:

the space rotation angle detection means acquires a point-of-balance position of the extracted operation object; and the space rotation angle detection means divides the extracted operation object along one of the followings:
a plurality of lines that passes through the acquired point-of-balance position; and
a parallel line, which is in parallel with a line passing through the point-of-balance position, and a crossing line, which intersects the parallel line.

12. The information device operation apparatus according to claim 9, further comprising at least three distance sensors, each of which measures a distance to the operation object, wherein:

the space rotation angle detection means detects the three dimensional rotation angle of the operation object based on the distances measured by the at least three distance sensor.

13. The information device operation apparatus according to claim 9, wherein:

the illumination device includes a first illumination device generating a first light and a second illumination device generating a second light;

the second illumination device is disposed at a position different from a position of the first illumination device;

the second illumination device is configured to generate the second light that intersects the first light generated by the first illumination device at a position that is a first predetermined distance away from the image capturing device;

the space rotation angle detection means detects the first light and second light projected on the operation object based on the image inputted by the image capturing device; and the space rotation angle detection means detects the three dimensional rotation angle of the operation object based on a distance between the first light and the second light projected on the operation object, the operation object being positioned on an imaginary plane, which is a second predetermined distance away from the image capturing device, and which is perpendicular to the optical axis of the image capturing device.

14. The information device operation apparatus according to claim 13, wherein:

the first illumination device is configured to generate the first light that has directivity; and the second illumination device is configured to generate the second light that has directivity.

15. The information device operation apparatus according to claim 13, further comprising:

a first baffle device that is disposed between the first illumination device and the operation object, the first baffle device having an opening, the first baffle device allowing the first illumination device to project part of the first light on the operation object through the opening of the first baffle device; and a second baffle device that is disposed between the second illumination device and the operation object, the second baffle device having an opening, the second baffle device allowing the second illumination device to project part of the second light on the operation object through the opening of the second baffle device, wherein:

the first baffle device and the second baffle device are arranged such that the part of the first light intersects the part of the second light at a position that is the first predetermined distance away from the image capturing device;

the space rotation angle detection means detects the part of the first light and the part of the second light projected on the operation object based on the image inputted by the image capturing device; and the space rotation angle detection means detects the three dimensional rotation angle of the operation object based on a distance between the part of the first light and the part of the second light projected on the operation object, the operation object being positioned on the imaginary plane, which is the second predetermined distance away from the image capturing device, and which is perpendicular to the optical axis.

16. The information device operation apparatus according to claim 8, wherein:
the detection means includes space movement detection means for detecting a movement direction and a movement amount of the operation object in the three dimensional space; and
the signal output means outputs the detected movement direction and the detected movement amount of the operation object in the three dimensional space.

17. The information device operation apparatus according to claim 16, wherein:
the space movement detection means detects an average luminance value of the extracted operation object at predetermined time intervals, the extracted operation object being extracted by the operation object extracting means; and
the space movement detection means detects the movement of the operation object in a direction of the optical axis of the image capturing device by comparing the detected average luminance values.

18. The information device operation apparatus according to claim 16, further comprising:
a distance sensor that measures a distance to the operation object, wherein:
the space movement detection means detects the movement direction and the movement amount of the operation object in the three dimensional space based on the distance detected by the distance sensor.

19. The information device operation apparatus according to claim 16, wherein:
the illumination device includes a first illumination device generating a first light and a second illumination device generating a second light;
the second illumination device is disposed at a position different from a position of the first illumination device;
the second illumination device is configured to generate the second light that intersects the first light generated by the first illumination device at a position that is a predetermined distance away from the image capturing device;
the space movement detection means detects a first light spot and a second light spot, which are formed on the operation object, based on the image inputted by the image capturing device, the first light spot being formed by projecting the first light on the operation object, the second light spot being formed by projecting the second light on the operation object;
the space movement detection means detects a size of the detected first light spot and a size of the detected second light spot based on the image acquired from the image capturing device; and
the space movement detection means detects a distance to the operation object based on the size of the first light spot and the size of the second light spot.

20. The information device operation apparatus according to claim 19, wherein:
the first illumination device is configured to generate the first light that has directivity; and
the second illumination device is configured to generate the second light that has directivity.

21. The information device operation apparatus according to claim 19, further comprising:
a first baffle device that is disposed between the first illumination device and the operation object, the first baffle device having an opening, the first baffle device allowing the first illumination device to project part of the first light on the operation object through the opening of the first baffle device; and
a second baffle device that is disposed between the second illumination device and the operation object, the second baffle device having an opening, the second baffle device allowing the second illumination device to project part of the second light to the operation object through the opening of the second baffle device, wherein:
the first baffle device and the second baffle device are arranged such that the part of the first light intersects the part of the second light at a position that is a predetermined distance away from the image capturing device;
the space movement detection means detects the part of the first light and the part of the second light, which are projected on the operation object, based on the image inputted by the image capturing device;
the space movement detection means detects a first light spot and a second light spot, which are formed on the operation object, based on the image inputted by the image capturing device, the first light spot being formed by projecting the first light on the operation object, the second light spot being formed by projecting the second light on the operation object;
the space movement detection means detects a size of the detected first light spot and a size of the detected second light spot based on the image acquired from the image capturing device; and
the space movement detection means detects a distance to the operation object based on the size of the first light spot and the size of the second light spot.

22. The information device operation apparatus according to claim 8, wherein the signal output means is configured to output at least one of a rotation angle, a movement direction, a the movement amount of the operation object in the space detected by the detection means.

23. The information device operation apparatus according to claim 1, wherein the signal output means is configured to output the signal that corresponds to the predetermined shape of the operation object detected by the detection means.

24. The information device operation apparatus according to claim 23, wherein:
the image storage means stores a predetermined pattern image; and
the detection means determines that the operation object has the predetermined shape by comparing the predetermined pattern image stored in the image storage means and the image of the operation object extracted by the operation object extracting means.

25. The information device operation apparatus according to claim 1, further comprising output switch means for switching the signal, which is outputted by the signal output means, based on an operation by an operator, wherein:
the signal output means is configured to output the signal in accordance with a state of the output switch means when the operation object indicates the predetermined shape and movement.

26. The information device operation apparatus according to claim 25, wherein:
the output switch means is operated when the operator pushes the output switch means;
the signal output means outputs a first signal when the output switch means is pushed; and
the signal output means outputs a second signal when the output switch means is not pushed.

* * * * *